Patented Oct. 3, 1950

2,524,718

UNITED STATES PATENT OFFICE 2,524,718

PROCESSING OF WASTES

William H. Stark and Louis Manna, Louisville, Ky., assignors to Joseph E. Seagram & Sons, Inc., Shively, Ky., a corporation of Indiana No Drawing. Application November 6, 1946, Serial No. 708,187

4 Claims. (Cl. 99—5)

This invention relates to a process of preparing foods or food additives suitable for human consumption from wastes such as distillers' wastes.

The economical disposal of wastes such as distillers' wastes has been the subject of intensive investigation and research for many years. Such wastes are known to possess considerable food value but it has been present in such complex forms and of such a taste character as to make it fit only for animal feed. In the past, it has been possible only to dispose of the waste at a nominal price for the feeding of animals, or in some cases, give it away for the hauling away.

The present process has as its major object the novel processing of such wastes in a manner whereby excellent foodstuffs and additives for foodstuffs for human consumption can be secured therefrom.

A further object of the invention is the provision of a novel process for processing distillers' wastes wherein products of considerably higher economic value than obtained heretofore are secured.

Other objects and advantages of the invention will be apparent from the following description and claims.

The process of the present invention is concerned with the treatment of distillers' dried soluble grain, this being the solids obtained after drying of the thin stillage, the moisture content thereof being about 8%. Thin stillage is the liquid and finely divided solids resulting from a screening of the whole stillage. Such dried solubles usually run about 30% to 33% protein and 8% to 10% fat, these constituents being combined and mixed with other constituents in a manner to render them highly undesirable for use in or as human foodstuffs.

Broadly, the treatment of the dried solubles in the present case comprises a solvent extracting step followed by removal of the extracting medium, and a heat treatment. While it has been proposed to treat distillers' wastes by extraction processes, the function of the solvent medium in such cases was to recover special constituents thereof such as glycerin and organic acids, selective extraction, based on the type solvent used, being employed to extract the desired substances. In all such cases, little or no attention has been paid to the residue and it has been considered to be virtually waste, fit only for animal feed.

In the present process, the extraction and the after-processing is such that the solids finally secured, which may be termed "neutral solubles" are a nonhygroscopic concentrated mixture of yeast protein material having a bland to nutty flavor and good keeping qualities, all undesirable taste constituents thereof being apparently removed or converted to a palatable form. The "neutral solubles" serve as excellent food for human consumption, and may be added to vegetable and cereal dishes, or to flour, to increase the protein content.

In a preferred process of this invention, dried solubles are first submitted to extraction, with solvent combinations such as water, methanol and ether; methanol and ether, and ethanol and ether, the solubles being treated with successive portions of such solvents. Absolute synthetic methanol (substantially 100%) alone has been found to give the best results, as it removes the substances which render the product unpalatable and otherwise generally unfit for human consumption. Ethanol alone has been found suitable where the product is to be used directly as a human foodstuff in cereal flours and the like. It is also possible that such solvents, particularly methanol at the preferred temperature of the treament, convert some unpalatable constituents to palatable forms although there is no positive evidence in support of this theory.

The extraction may be carried out in any suitable apparatus. An extractor of the horizontal screw type has been found most suitable, heated through a water jacket to a temperature approaching the boiling point of the solvent but not in excess thereof, i. e., preferably about 90 to 110° F. and the speed thereof being such that the solubles are contained therein about 16 minutes. The time of treatment can be varied in accordance with the temperature of the solvent and the final products desired. The quantity of solvent employed may be in a range from two to four times the quantity of solubles treated on a weight basis. The preferred ratio is three to one by weight. It has been found most efficient to introduce the fresh solvent at the discharge end of the extractor and remove it at the feed end, the most nearly extracted solubles thus being subjected to the solvent in its purest form. The solvent is collected, distilled and reused, the substances extracted from the solubles being recovered as desired.

The solubles, after draining but still wet with the solvent, are now subjected to a sustained heat treatment at a temperature in considerable excess of the boiling point of the solvent, or to a solvent removal treatment at a temperature above the boiling point of the solvent followed by the aforesaid heat treatment at the higher temperature. It is preferred to treat the solubles in one or more heating units of the screw conveyor type, the temperature therein being maintained at 230° F. to 250° F. by heating means such as steam jackets, the solubles being so heated for about 40 minutes. If the solvent be driven off in a preliminary heating step, the length of the heat treatment at the higher temperature may be reduced.

This method of heat treatment after the extraction has been found to produce an entirely different product from a treatment wherein the solubles are heated only slightly above the boiling point of the solvent to remove the solvent therefrom. The flavor of the solubles so processed is materially improved, and they are slightly darker in color. The solubles have been found to provide excellent bases for other human foodstuffs, particularly as regards palatability and do not become rancid during long periods of storage. Without further processing the products have been found to be highly palatable and suited for use as cereal and flour additives, milk supplements, meat extenders and like human foodstuffs.

Having described our invention, we claim:

1. A method of processing solubles from distillers' wastes to provide a palatable product suitable as a food for human consumption and not turning rancid over long periods of storage, which comprises: subjecting the solubles in a substantially dry state to extraction with an organic solvent capable of removing fats, glycerine, alcohol soluble compounds and other compounds which impart unpalatability to the wastes; draining off the solvent; and heating the residue at a temperature above the boiling point of the solvent.

2. The method of producing a food product for human consumption comprising: treating substantially dry distillers' solubles with a solvent comprising an alcohol having less than three carbon atoms and ether; separating the residue from the solvent; then heating the residue above the boiling point of the solvent.

3. The method of producing a food product for human consumption comprising treating substantially dry distillers' solubles with a solvent comprising methanol and ether; separating the residue from the solvent; then heating the residue above the boiling point of the solvent.

4. A method of processing dried soluble grain from distillers wastes to produce a palatable, stable non-hygroscopic food which comprises: subjecting dried distillers soluble grains to extraction with an alcoholic solvent to remove fats, glycerine and compounds which impart an unpalatable taste to the solubles; draining off the solvent; and heating the residue at a temperature above the boiling point of the solvent.

WILLIAM H. STARK.
LOUIS MANNA.

REFERENCES CITED

The following references are of record in the file of this patent:

UNITED STATES PATENTS

| Number | Name | Date |
| --- | --- | --- |
| 1,147,767 | Laszloffy | July 27, 1915 |
| 1,147,768 | Laszloffy | July 27, 1915 |
| 2,225,428 | Christensen | Dec. 17, 1940 |
| 2,277,361 | Bonotto | Mar. 24, 1942 |